Nov. 22, 1938. H. E. WHITE 2,137,257
METHOD OF MAKING WIRE MESH
Original Filed April 20, 1936 8 Sheets-Sheet 1

Inventor
H. E. WHITE

Nov. 22, 1938.   H. E. WHITE   2,137,257
METHOD OF MAKING WIRE MESH
Original Filed April 20, 1936   8 Sheets-Sheet 3

Inventor
H.E.WHITE

Nov. 22, 1938.   H. E. WHITE   2,137,257
METHOD OF MAKING WIRE MESH
Original Filed April 20, 1936   8 Sheets-Sheet 4

Inventor
H. E. WHITE

Attorney

Nov. 22, 1938.  H. E. WHITE  2,137,257
METHOD OF MAKING WIRE MESH
Original Filed April 20, 1936   8 Sheets-Sheet 5

Inventor
H. E. WHITE

Nov. 22, 1938.　　　H. E. WHITE　　　2,137,257
METHOD OF MAKING WIRE MESH
Original Filed April 20, 1936　　8 Sheets-Sheet 6

Nov. 22, 1938.    H. E. WHITE    2,137,257
METHOD OF MAKING WIRE MESH
Original Filed April 20, 1936    8 Sheets-Sheet 8

Inventor
H. E. WHITE

Patented Nov. 22, 1938

2,137,257

UNITED STATES PATENT OFFICE 2,137,257

METHOD OF MAKING WIRE MESH

Herbert E. White, San Francisco, Calif., assignor to E. H. Edwards Company, a corporation of California Original application April 20, 1936, Serial No. 75,488. Divided and this application November 13, 1936, Serial No. 110,745

8 Claims. (Cl. 140—112)

The present application is a division of application, Serial No. 75,488, filed April 20, 1936. In that application is described and claimed a machine, by means of which the method is set forth and claimed in this application.

The invention relates to a method of making an opened mesh wire fabric of crossed strands, the strands being in continuous lengths throughout the fabric. The fabric, which is produced by this method, is composed of a plurality of layers, each layer being composed, in turn, of a plurality of strands that extend diagonally across the fabric, and which are at the selvage edge rebent to extend as a different layer across the fabric in the opposite direction, and at a reverse angle. The different layers of the fabric lie one within the other, and the strands are secured together, as by a welding at each crossing point.

The object of the invention is to provide a method, whereby such a fabric can be made from continuous strands of wire.

Another object is to provide a method, whereby the strands are formed into the fabric in a simple manner by first forming a tubular body, and then flattening the body, and afterwards welding the crossing strands together.

The method of making this fabric comprises briefly, laying the strands in the form of coils upon a tubular mandrel, having a travelling surface, whereby the coils are caused, as they are carried away from the strand-laying mechanism, to assume the form of spirals. Thereafter the tubular fabric is drawn to the mandrel and collapsed into the form of a flat sheet. The strands, which are laid on the mandrel, make up successive layers, each comprising a plurality of the strands. The successive layers, which are laid about the mandrel, are wound in opposite directions so that the spiral strands of one layer cross those of the adjacent layer. When the tubular structure made up of these crossing spiral coils is collapsed, the layers forming the wall of half of the tubular structure become superposed on the layers forming the other half, and as each half of the tubular fabric is composed of strands in crossing layers, the flattened fabric consists of a fabric of double the number of layers forming the wall of the tubular structure. The tubular structure is so wound and the collapsing operation is so performed, that when the layers are thus superposed, those forming one half of the tubular structure are positioned between those that form the other half, this resulting in a completed fabric in which the meshes are of half the size of those of the tubular fabric.

In the accompanying drawings:

Figure 4a is a similar view showing the strand-laying mechanism and the mandrel.

Figure 6 is a sectional view taken on the line 6—6 of Figure 4a.

Figure 7 is a sectional view taken on the line 7—7 of Figure 4a.

Figure 9 is a perspective view of the conveyor chain shown in Figure 8.

Figure 10 is a cross sectional view on the line 10—10 of Figure 4a.

Figure 4:
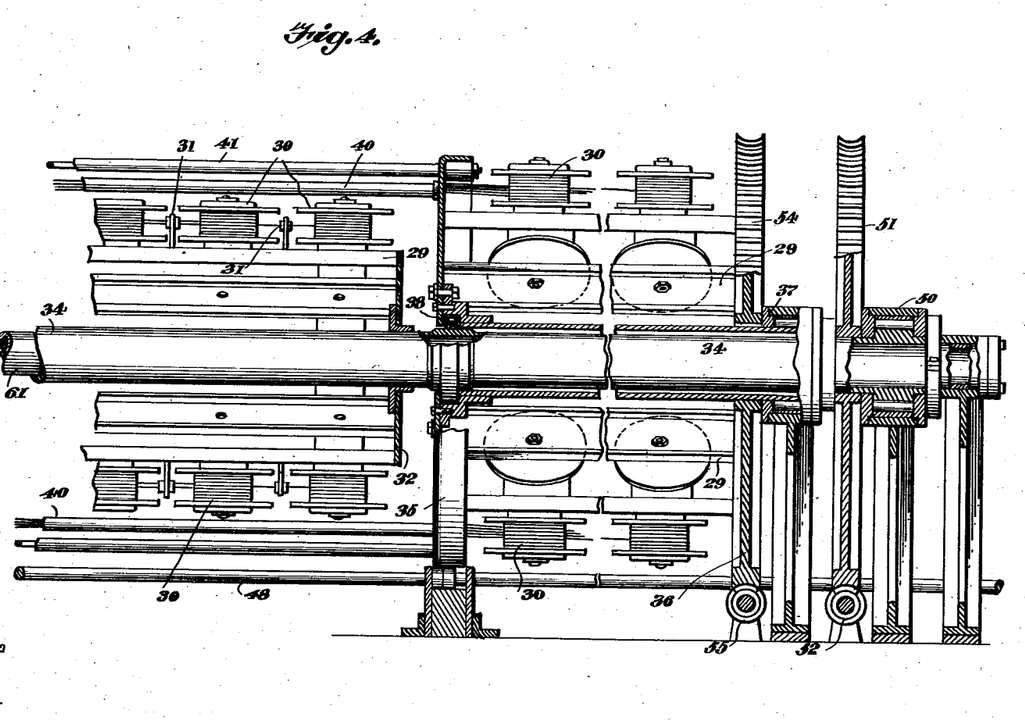
Figure 4 is an enlarged vertical sectional view showing the structure of the strand-supplying reels.

The drawings illustrate a mechanism, by means of which the method may be performed. Describing them more particularly, the machine may be divided into three parts, generally being a strand-supplying mechanism 25, a fabric-forming mechanism 26, and welding mechanism 27. The strand-supplying mechanism may comprise a plurality of reels 28 revolubly mounted with respect to each other and positioned in end-to-end relation. Referring to Figure 4, it will be seen that each reel includes a plurality of horizontally disposed bars 29 that support, respectively, a plurality of strand-supplying spools 30. The bars 29 may also be provided with strand guides 31 through which the strands are led as they are fed to the fabric-forming mechanism. The bars 29 of the forward reel or the one towards the fabric-forming mechanism, are supported by heads 32 and 33 that are in turn supported and secured to a tubular shaft 34. The bars of the rearward reel are supported by heads 35 and 36 which are supported by and secured to a tubular shaft 37, through which the tubular shaft 34 extends and which is rotatable with respect thereto. Suitable bearings, as at 38, may be interposed between the shaft 34 and the structure of the rearward reel, through which it passes.

Surrounding the forward end of the forward reel and revoluble with respect to its head 33, as shown in Figure 4a, is a strand-laying arm-carrying ring 39. Between this ring 39 and the head 35 of the rearward reel are tubular guides 40, through which the strands are led from the spools of the rearward reel. Suitable tie bolts, as at 41, may secure the ring 39 to the head 35.

Figures 4, 5:
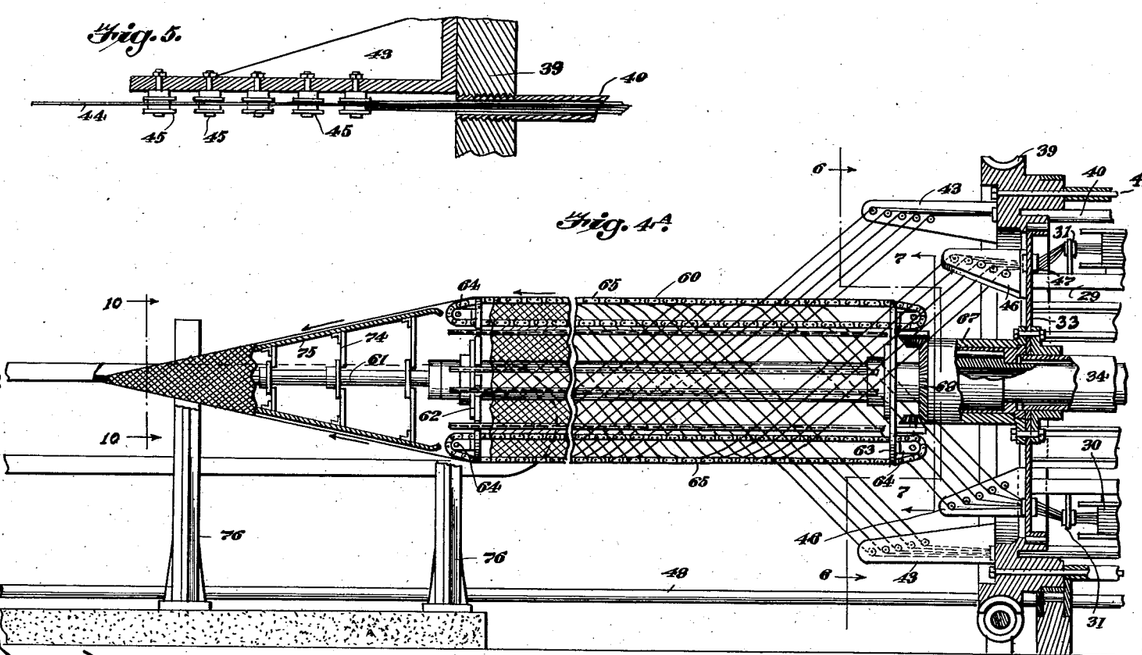
Figure 5 is a detail sectional view of one of the strand-laying arms.

A plurality of spools 30 are supported upon each of the bars 29 of each of the reels. Each tubular guide 40 is associated with each of the bars 29 of the rearward reel to accommodate the strands drawn from the spools of that particular bar. Associated with each of the tubular guides and supported by the ring 39 is a strand-laying arm 43. As shown in Figure 5 these arms 43 are bracket-like in shape, and extend axially of the ring 39. For each of the strands 44, is a guide wheel 45, about which the strand passes. Similar strand-laying arms 46 are mounted upon the head 33 of the forward reel, there being one arm 46 associated with each bar 29 of this reel. The strands are led through the guides 31, supported by the bars 29, and through a guide 47, upon the head to the arm 46.

The drive for these strand-supplying reels comprises a main shaft 48, driven through suitable gearing by a motor 49. As shown in Figure 4, the tubular shaft 34 extends rearwardly through the rear head 36 of the rearward reel, and is supported in a bearing 50. Upon the shaft 34 is secured a worm gear 51 that meshes with a worm 52 geared through bevel gears 53 to the drive shaft 48.

The rear head 36 of the rearward drum carries a worm gear 54 about its periphery. This gear 54 is driven by a worm 55 which is geared through bevel gears 56, to the shaft 48. The bevel gears 53 and 56 are so disposed that the worms 52 and 55 are driven in opposite directions, so that the forward and rearward reels revolve oppositely as they are driven by the shaft 48. The arm-carrying ring 39 bears about its outer periphery, a worm gear 57 that is meshed with a worm 58, driven through bevel gears 59 from the drive shaft 48. The bevel gears 59 are similarly disposed to the bevel gears 53, so that the ring is driven in the direction, and at the same speed as the rearward reel.

As the two reels revolve in opposite directions, it will be appreciated that strands are laid by the arms 43 and 46 in the form of coils upon a mandrel 60 which is disposed in proper relation in front of the forward end of the forward reel. The mandrel 60 is so constructed as to carry the coils forward as they are laid, causing them to assume the form of spiral coils, those being laid by the arms 46 extending in the opposite direction, and therefore crossing those laid by the arms 43.

The mandrel is constructed as follows. A shaft 61 extends from the rear of the machine to the forward end of the mandrel, running through the tubular shaft 34 and through the center of the mandrel. Upon this shaft 61 are mounted at the front and rear end of the mandrel, respectively, stationary heads 62 and 63. Supported upon the heads 62 and 63 are sprocket wheels 64, those of the respective heads being in aligned relation. Sprocket chains 65 pass about these sprocket wheels axially of the mandrel and the outer reaches of these chains form the mandrel surface upon which the strands are laid.

Figure 6:
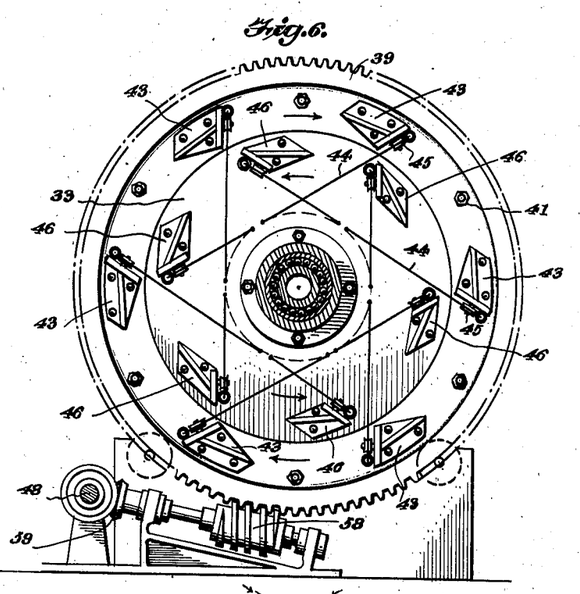
Figure 7:
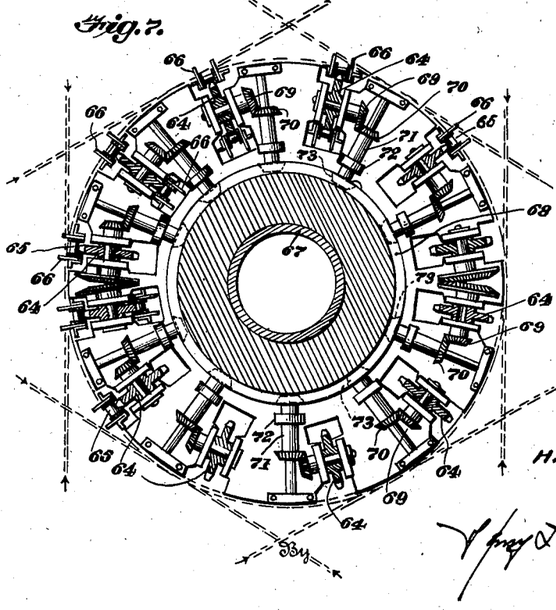
Figure 8:
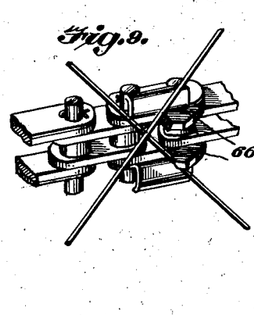
Figure 8 is an enlarged detail view partly in section, showing the fabric-carrying structure of the mandrel.

Referring to Figures 6 and 8, it will be seen that the sprocket chains 65 are provided at proper intervals with outstanding lugs 66 which engage the strands as they are laid. As the strands are laid by the arms 43 and 46 they are wrapped around the body formed by the outer surfaces of the sprocket chains 65 and are engaged by the lugs 66. The sprocket chains are driven to move the outer reaches thereof in a forward direction, carrying the tubular structure, which is formed by the laying of the strands towards the discharge end of the machine.

The sprocket chains 65 may be driven in the following manner. The head 33 of the forward reel may be provided with a tubular extension 67 that extends to a point adjacent the rearward head 63 of the mandrel. At its forward end the extension 67 is provided with a bevel gear 68. The sprocket wheels 64 of the rearward head 63 of the mandrel may be associated with bevel gears 69 mounted upon the ends of the shafts which support the sprocket wheels. The bevel gears 69 engage bevel gears 70 upon shafts 71 supported in suitable brackets 72 carried by the head 63, and carrying at their inner ends bevel gears 73 meshing, in turn, with the bevel gears 68. It will be seen that as the head 63 is driven by the drive shaft 48, the gear 68 will revolve, driving the sprocket wheels 64 through the bevel gears 73, shaft 71, bevel gears 70 and 69.

Figure 1:
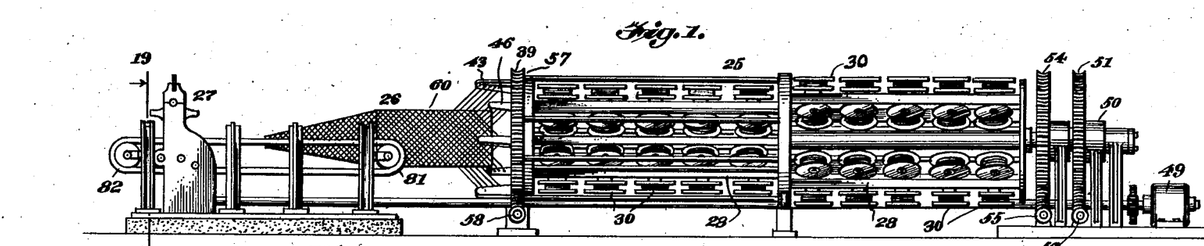
Figure 1 is an elevation of the complete machine.
Figure 2:
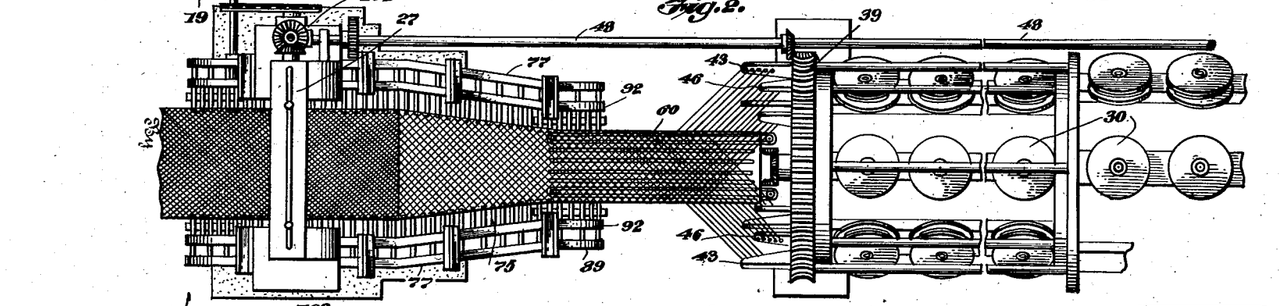
Figure 2 is an enlarged plan view of the strand-laying, flattening and welding mechanism.
Figure 3:
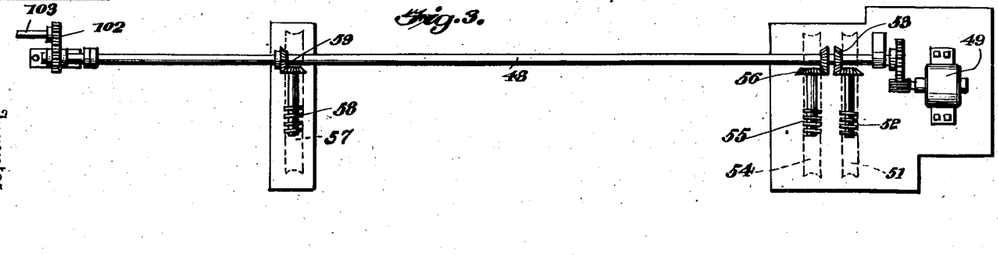
Figure 3 is a schematic plan view showing the driving mechanism.

When the tubular fabric formed by the above described mechanism reaches the end of the chain 65, it is subjected to a flattening operation. This may be performed by the following mechanism. Upon the shaft 61 are mounted a plurality of spaced supports 74 that support a flat tapered mandrel 75. As shown in Figure 2, the width of the mandrel 75 increases toward the forward or discharge end of the machine. As the tubular fabric advances over the tapered mandrel 75, it is flattened and the layers forming the upper half of the tubular structure are caused to bridge those forming the lower half.

Figure 10:
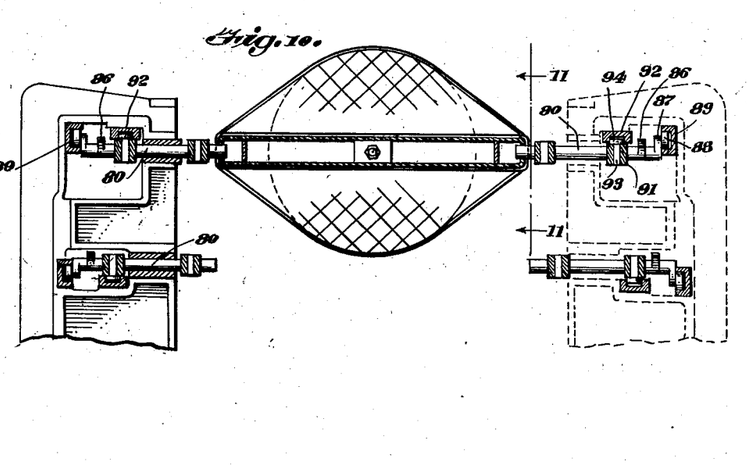
Figure 16:
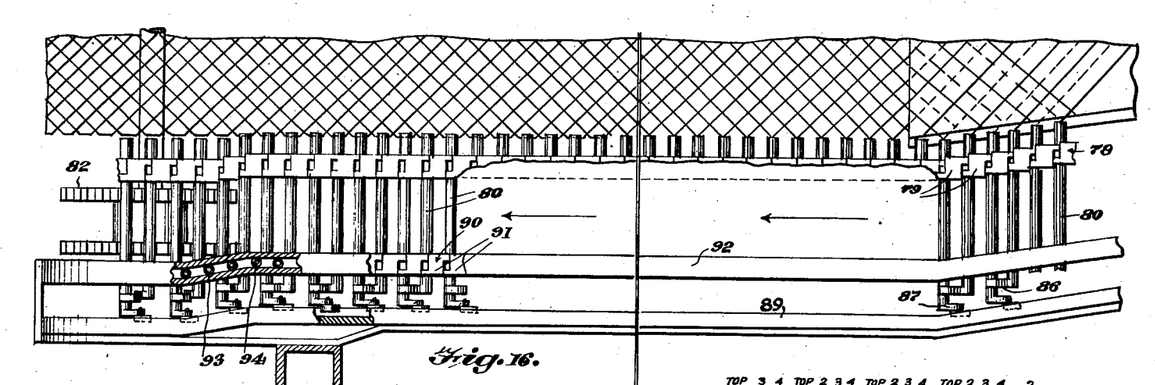
Figure 16 is a plan view showing the operation of the strand-gripping means as the fabric is carried through the welder.

As it is desirable to maintain the cross strands in fixed relation during this operation, the following mechanism may be advantageously employed. At either side of the tapering mandrel 75 are supports 76 that support a conveyor system, generally 77. Referring to Figures 10 and 16, it will be seen that the conveyors include endless chains 78 composed of overlapping links 79 that are secured together by relatively long pins 80 extending through adjacent links. The chains 78 pass about wheels 81 adjacent the large end of the tapering mandrel and wheels 82 at the discharge end of the machine.

The inner ends of the pins are provided with slots 83, into which the portion of a strand that is to form a part of the selvage edge of the fabric, may be introduced.

Figures 17, 18, 23, 24:
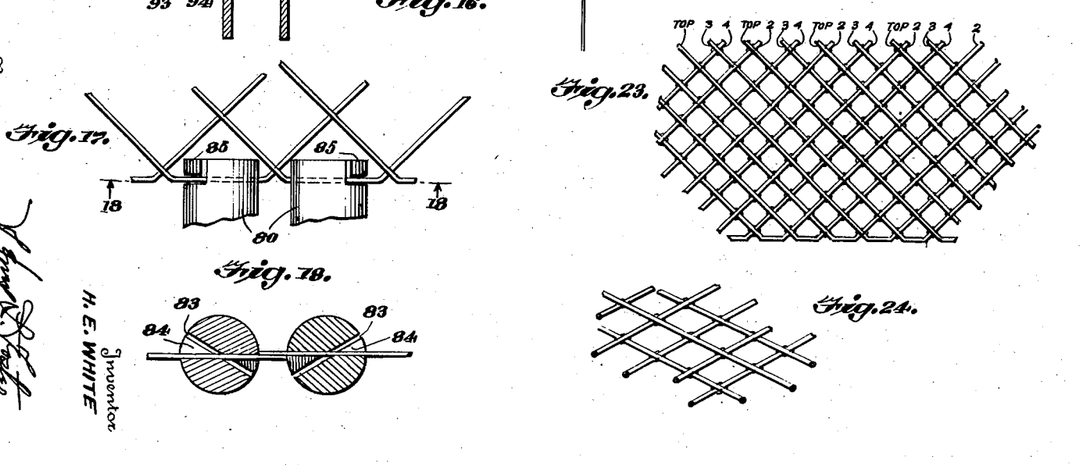
Figure 17 is a detail plan view of the strand-gripping devices.
Figure 18 is a sectional view on the line 18—18 of Figure 17.
Figure 23 is a plan view of a section of fabric produced by the method.
Figure 24 is a perspective view of a section of the fabric.
Figure 19:
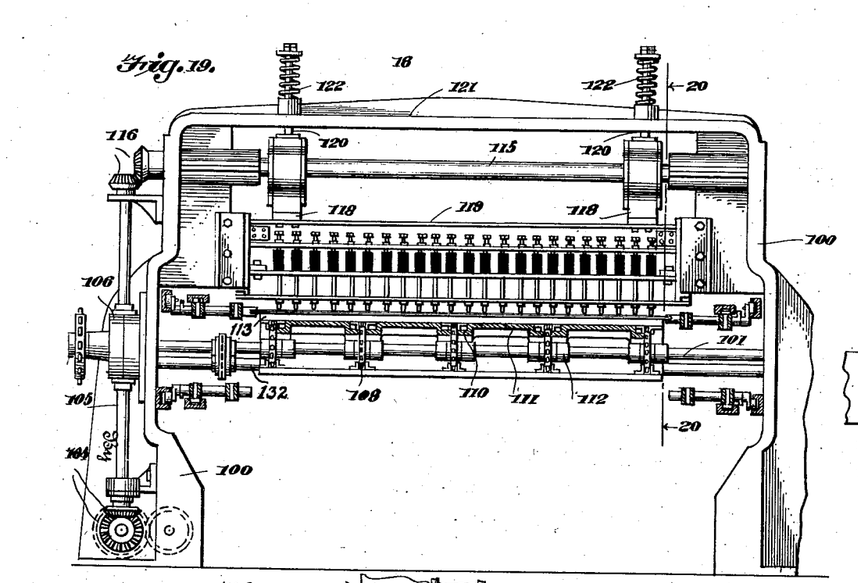
Figure 19 is a view taken on the line 19—19 of Figure 1.
Figure 20:
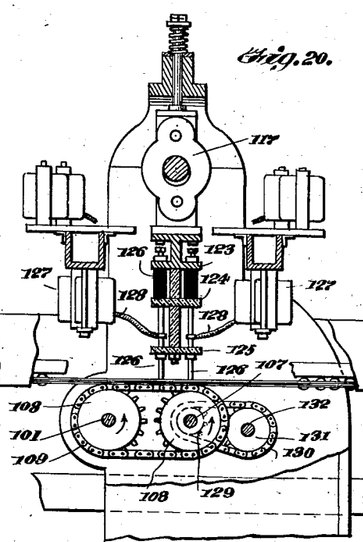
Figure 20 is a sectional view on the line 20—20 of Figure 19.
Figure 21:
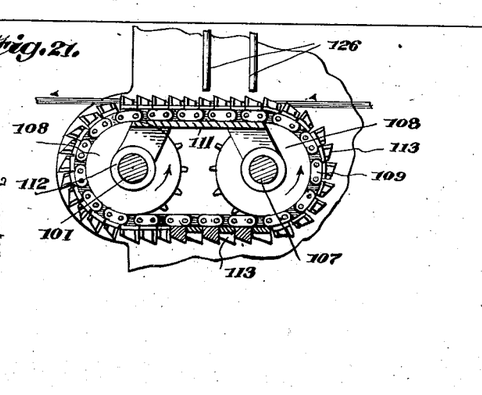
Figure 21 is a detail view of the lower electrode of the welder.

The slots 83 interiorly of the pin widen axially as shown in Figure 18, to provide a socket 84 with overlapping portions 85 within which the strand may be engaged. The pins 80 are revoluble in the links 79 and pairs of adjacent pins are coupled by segment gears 86. One of each pair of pins is provided with a crank arm 87 carrying at its end a roller 88. Rollers 88 engage in a cam track 89 that runs parallel to the edge of the fabric from the end of the tubular mandrel 60 to the discharge end of the machine. This cam track is so arranged that slightly before the fabric leaves the tubular mandrel 60, the crank arm 87 will be swung, thus turning the adjacent pins 80 in opposite directions. As will be later described at this time the strands are engaged in the sockets 84 and this will have the effect of locking them into the pins.

Figures 11, 12, 13, 14, 15:
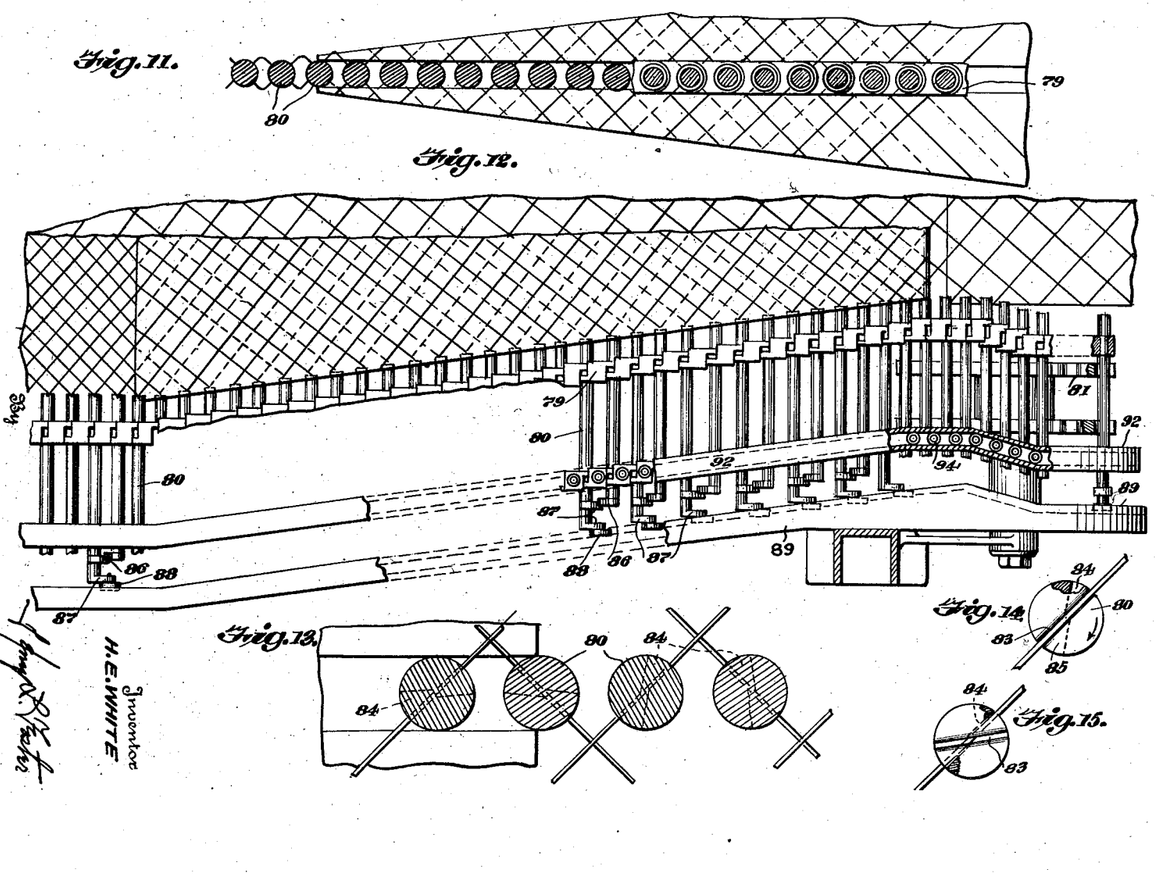
Figure 11 is a sectional view on the line 11—11 of Figure 10.
Figure 12 is an enlarged plan view of the flattening mechanism.
Figure 13 is a detail view of the strand-gripping mechanism of the flattening means.
Figures 14 and 15 are detail views illustrating the operation of the strand-gripping means.

As has been previously mentioned, adjacent links 79 of the chains 86 are relatively slidable laterally. Rearwardly of the chain 78 and spaced therefrom is a second chain 90 formed by links 91 that overlap and are similar to the links 79. The chain 78 runs beneath a cam track 92 which is channeled on its under side. The links 91 carry vertical pins 93 that carry on their top ends rollers 94 that run in the cam track 92. The cam track 92, as will be seen by referring to Figure 12, runs from a point toward the rear of the discharge end of the tubular mandrel 60 toward the mandrel 60, thence parallel to the sides of the mandrel 60, to its end, then parallel to the edges of the tapered mandrel 75, to its end, and then straight forward to the discharge end of the machine. The cam track 89 parallels the track 92.

The operation of these conveyors which are duplicated on each side of the machine, is as follows:

The horizontal motion of the pins is governed by the cam track 92 and as the pins advance from the rear end of the conveyor in the direction in which the fabric is traveled, they first approach the strands which are advancing upon the tubular mandrel, and a strand enters into a slot in the end of each pin. At this time, due to the configuration of the track 89, the pins are swung, locking the strands in the ends of the pins. As the fabric and conveyors advance upon the tapered mandrel 75, the pins 80 are drawn outwardly by the diverging portions of the tracks 92, holding the strands in their proper relation as the top and bottom halves of the tubular fabric structure are brought together. After the fabric leaves the tapered mandrel 75, the travel of the pins 80 of the two conveyors become parallel, and the strands are held by them in their proper relation during their passage through the welder 27. After the welding operation the cam track 89 swings the pins to their unlocking position, shown in Figure 18, when the pins are drawn from the fabric.

After the fabric has left the tapered mandrel, it is carried in its collapsed and flattened condition to a welding apparatus 27, the strands being held in their proper relation to each other by the pins 80 of the conveyors. In the welder the strands are welded together at each of their crossing points to form the fabric into a completed structure. Advantageously the welder may be constructed as follows: Outside of each of the cam tracks 89 is an upstanding support 100 that support in suitable bearings a main drive shaft 101 extending between them. The drive shaft 101 is driven from the shaft 48 by means of spur gears 102, the supplemental shaft 103, bevel gears 104, and a vertical shaft 105 connected with the shaft 101 by means of any suitable type of gearing, as at 106. Spaced from the shaft 101 toward the strand-laying mechanism is a second transverse shaft 107. The shafts 101 and 107 each carries a plurality of sprocket wheels 108, about which run sprocket chains 109 running in channels 110 in a flat surfaced table 111 that may be supported on the shafts 101 and 107 by means of journals 112 that surround the shafts.

Figure 22:
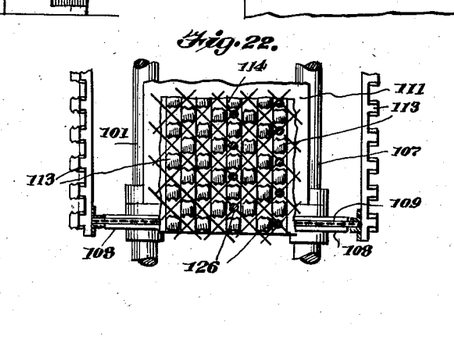
Figure 22 is a plan view of the electrode of the welder.

The chains 109 carry electrode bars 113 that extend transversely of the machine throughout the width of the fabric and which slide upon the top of the table 111 as the chains travel. The bars are so spaced that each one underlies a row of crossing points of the strands forming the fabric as the fabric is fed through the machine. Preferably the upper surfaces of the bars are provided with sockets 114, as shown in Figure 22, the sockets being connected by suitable channels for the reception of the strands, the crossing points of which are within the sockets. The sockets are of proper size to receive the upper electrodes that will be later described.

At a point spaced above the table 111, the supports 100 carry a rotary shaft 115 driven through bevel gears 116 from the shaft 105. The shaft 115 carries cams 117 that are engaged in hangers 118 that support the upper electrode in the machine, and which operate to reciprocate the upper electrode-holding frame 119 at definite intervals in timed relation with the travel of the electrode bars 113. The hangers 118 may be provided with upwardly extending rods 120 that pass through a cross bar 121 between the supports 100, and which are cushioned by coiled springs 122.

The electrode frame 119 may comprise three transverse bars 123, 124 and 125, respectively. Electrodes 126 are slidably mounted in the lower two bars 124 and 125, these two bars being formed of insulating material. The electrodes are preferably backed by springs within tubular casings 126 in order to give a firm but yielding contact with the crossings of the strands which are to be welded. Current is supplied through transformers 127 to flexible lead rolls 128 connected to the electrodes. The welding circuit is so arranged that the current passes from one electrode downwardly through the crossing point which the electrode is in engagement with, through the electrode bar, and to another one of the electrodes, thence through that electrode and back to the transformer.

The conveyors 78 may be driven from the shaft 107 by means of a sprocket wheel 129 mounted thereon, a sprocket chain 130 and a sprocket wheel 131 mounted upon a transverse shaft 132, which drives the conveyor chains.

The method of making this fabric essentially comprises the winding of the strands in a plurality of layers in the form of a reticulated tubular structure, and thereafter flattening the tubular structue while holding the stands in proper relation, and thereafter welding each of the crossing points of the strands.

The fabric is illustrated in Figures 23 and 24, wherein it will be seen that the strands forming the outer layer of the tubular structure become the top and bottom strands of the completed fabric. These strands are labeled "top" where they cross the top of the strands, and "4" where they become the bottom strands, these strands running back and forth across the fabric and always on the outside. The inner layers of the tubular structure become the inner layers of the completed fabric. These strands are labeled "2" and "3", these figures indicating their relative order from the top layer of the fabric downwardly. The appearance of the fabric is that of a woven structure, this appearance being given by the fact that the strands pass over certain of the other strands and under still others of these strands.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. The method of forming an open meshed fabric of continuous crossed strands, which consists in laying a plurality of continuous strands to form a tubular body of said strands, and bringing together spaced portions of the walls of the body to form a plurality of superposed layers of strands, the strands of each layer crossing those of another layer.

2. The method of forming an open meshed fabric of continuous crossed strands which consists in laying the strands upon a mandrel to form a tubular body of coils, and collapsing the body to bring spaced portions of the walls thereof together to form a plurality of layers of strands in which the selvage is formed by the wires of one layer being looped and said wires extending from said loops across both layers.

3. The method of forming an open meshed fabric, of continuous crossed strands, which consists in laying a plurality of continuous strands in oppositely extending spiral coils in the form of a tubular open mesh body of crossed coils, collapsing said coils in unbroken condition into a sheet with opposite initially spaced walls forming a plurality of layers, and locating the crossed wires of one layer between the crossed strands of the other layer.

4. The method of forming an open meshed fabric of continuous crossed strands, which consists in forming a tubular body of said strands and drawing opposite portions of the body outwardly to bring initially spaced portions of the walls thereof between the outwardly drawn portions together to form a plurality of layers of strands and welding together the strands at their crossing points.

5. The method of forming an open meshed fabric, of continuous crossed strands, which consists in laying a plurality of continuous strands in oppositely extending spiral coils to form a tubular open mesh body of crossed spiral coils, collapsing said coils in unbroken condition into a sheet with opposite initially spaced walls forming a plurality of layers, locating the crossed wires of one layer between the crossed wires of the other layer, welding together the strands of each layer at their crossing points, and welding together the strands of the different layers at their crossing points.

6. The method of forming an open meshed fabric which consists in forming a tubular body having a wall comprising a layer including a plurality of sets of parallel strands, and collapsing the body to bring together spaced portions of the walls to form a flat body of the sets of strands, and welding together the strands of the different layers at their crossing points.

7. The method of forming an open meshed fabric of continuous crossed strands that consists in laying a plurality of continuous strands in spiral coils to form a tubular open mesh body of continuous spiral coils, and bringing together the walls of the body in unbroken condition to form a sheet composed of superposed layers comprising respectively the initially spaced opposite layers of the body.

8. The method of forming an open meshed fabric which consists in forming a tubular body by successively laying sets of spirally coiled parallel strands, the strands of the respective sets being oppositely coiled, and the strands of each set crossing those of the next set, collapsing the body to bring portions of the spaced walls together in superposed relation, and securing the strands together at their crossing points.

HERBERT E. WHITE.